US008146452B2

(12) United States Patent
Balleis et al.

(10) Patent No.: US 8,146,452 B2
(45) Date of Patent: Apr. 3, 2012

(54) APPARATUS FOR DRIVING A ROLLER OF A PRINTING PRESS AND PRINTING PRESS HAVING THE APPARATUS

(75) Inventors: Stephan Balleis, Heidelberg (DE); Rainer Hofmann, Hirschhorn (DE); Patrick Roth, Kandel (DE); Bernd Sitzmann, Sandhausen (DE); Markus Uihlein, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 857 days.

(21) Appl. No.: 12/208,761

(22) Filed: Sep. 11, 2008

(65) Prior Publication Data

US 2009/0120224 A1 May 14, 2009

(30) Foreign Application Priority Data

Nov. 12, 2007 (DE) ......................... 10 2007 053 805

(51) Int. Cl.
*F16H 57/10* (2006.01)
*F16D 65/36* (2006.01)

(52) U.S. Cl. ....................................... 74/411.5; 188/156

(58) Field of Classification Search ................. 74/411.5; 188/162, 156, 157, 77 W, 77 R
See application file for complete search history.

(56) References Cited

U.S. PATENT DOCUMENTS

| | | | | |
|---|---|---|---|---|
| 2,174,115 | A * | 9/1939 | Auld et al. | 173/164 |
| 2001/0052301 | A1 * | 12/2001 | Stieler et al. | 101/216 |
| 2009/0247345 | A1 * | 10/2009 | Desch et al. | 475/149 |

FOREIGN PATENT DOCUMENTS

| | | | |
|---|---|---|---|
| DE | 42 30 429 | A1 | 3/1994 |
| DE | 196 14 864 | A1 | 10/1997 |
| DE | 199 51 157 | A1 | 5/2001 |
| DE | 10 2004 024 549 | A1 | 12/2004 |
| DE | 20 2004 017 419 | U1 | 3/2005 |
| DE | 10 2004 022 250 | A1 | 12/2005 |
| DE | 10 2004 052 112 | A1 | 4/2006 |
| DE | 10 2005 050 433 | A1 | 1/2007 |
| EP | 1 093 913 | B1 | 4/2001 |

OTHER PUBLICATIONS

German Patent- and Trademark Office Search Report, dated Apr. 10, 2008.

* cited by examiner

*Primary Examiner* — Justin Krause
(74) *Attorney, Agent, or Firm* — Laurence A. Greenberg; Werner H. Stemer; Ralph E. Locher

(57) ABSTRACT

An apparatus for driving a roller of a printing press includes a main motor configured to drive the roller through a first gear wheel and a first freewheel, and an auxiliary motor configured to drive the roller through a second gear wheel and a second freewheel. A brake that is different from the main motor, for example a band brake, is configured to brake the roller during overrunning of the roller following a machine stop signal. A printing press having the apparatus is also provided.

10 Claims, 2 Drawing Sheets

APPARATUS FOR DRIVING A ROLLER OF A PRINTING PRESS AND PRINTING PRESS HAVING THE APPARATUS

CROSS-REFERENCE TO RELATED APPLICATION

This application claims the priority, under 35 U.S.C. §119, of German Patent Application DE 10 2007 053 805.9, filed Nov. 12, 2007; the prior application is herewith incorporated by reference in its entirety.

BACKGROUND OF THE INVENTION

Field of the Invention

The present invention relates to an apparatus for driving a roller of a printing press, in which a main motor is provided to drive the roller through a first gear wheel and a first freewheel, and an auxiliary motor is provided to drive the roller through a second gear wheel and a second freewheel. The invention also relates to a printing press having the apparatus.

Sheet-fed offset presses often include one or more varnishing units, which in each case have at least one varnishing unit roller. There are various reasons, for example a planned interruption to printing operation or an emergency situation which has occurred, for which the operator triggers a machine stop, for example by pressing a knob. Following the triggering of such a machine stop, the cylinders and rollers of the printing press should come to a standstill as quickly as possible. What is known as the run-down or overrun phase, which is to say the elapsed time interval beginning from the triggering of the machine stop until the complete standstill of the roller or the cylinder, should be as short as possible. Due to the moment of inertia of the roller or the cylinder, the minimization of the overrun phase is a problem. In particular, the overrunning of the aforesaid varnishing unit roller, which is to say its drive-free overrunning taking place following the triggering of the machine stop, what is known as "spinning to a halt", has been recognized as a problem.

In order to solve that problem, an apparatus corresponding to the generic type mentioned at the outset has been proposed in German Published, Non-Prosecuted Patent Application DE 10 2004 022 250 A1. In that apparatus, which is from the closest prior art, the varnishing unit roller has an operative connection through a first freewheel to a gear train assigned to the main motor of the printing press and, during printing operation carried out without varnishing, can be driven by an auxiliary motor. A controllable clutch, which is disposed in parallel with the first freewheel, is controlled in such a way that it is disengaged when the printing press is at a standstill and when the auxiliary motor is switched on and in such a way that the clutch is switched into an engaged position, bridging the first freewheel, when the rotational speed of the varnishing unit roller exceeds the rotational drive speed of the auxiliary motor as a consequence of the printing press being driven by the main motor. The auxiliary motor is operatively connected to the varnishing unit roller through a second freewheel. In that case, therefore, the main motor functions as an electric motor brake for braking the varnishing unit roller during the overrunning of the varnishing unit roller taking place following the machine stop signal.

German Published, Non-Prosecuted Patent Application DE 199 51 157 A1, corresponding to European Patent EP 1 093 913 B1 and German Published, Non-Prosecuted Patent Application DE 10 2004 052 112 A1 contain further prior art.

SUMMARY OF THE INVENTION

It is accordingly an object of the invention to provide an apparatus for driving a roller of a printing press and a printing press having the apparatus, which overcome the hereinafore-mentioned disadvantages of the heretofore-known devices of this general type.

With the foregoing and other objects in view there is provided, in accordance with the invention, an apparatus for driving a roller of a printing press. The apparatus comprises first and second gear wheels, first and second freewheels, a main motor for driving the roller through the first gear wheel and the first freewheel and an auxiliary motor for driving the roller through the second gear wheel and the second freewheel. A brake, being different from the main motor, is provided for braking the roller during overrunning of the roller following a machine stop signal.

One advantage of the apparatus according to the invention is to be seen in its greater functional reliability. As a result of the brake being different from the main motor, the time of the overrunning of the roller until it is at a standstill can be shortened considerably. Another advantage is to be seen in the structural conditions, on the basis of which the apparatus according to the invention can be implemented particularly inexpensively.

In accordance with another feature of the invention, the brake that is different from the main drive can be an electromagnetic brake, for example an eddy current brake. In this case, the brake that is different from the main motor can be a brake that is also different from the auxiliary motor. The brake that is different from the main motor can also be a fluid brake or hydrodynamic brake.

In accordance with a further feature of the invention, the brake is a mechanical brake. In such a mechanical brake, the braking action is effected by solid body friction acting between two braking elements of the brake. In this case, the brake can, for example, be a caliper brake or a disk brake. The mechanical brake is preferably a band brake. The construction as a band brake is advantageous with regard to its so-called wet running capability. The band brake can be disposed in the immediate vicinity of gear elements, for example gear wheels, lubricated with lubricating oil, without there being a danger that oil spraying or dripping onto the band brake from the gear elements will reduce the functional reliability of the band brake. Complicated encapsulation of the band brake in order to protect against the oil is not necessary. The band brake can therefore be disposed on what is known as the drive side of the printing press, on which drive side the first gear wheel and the second gear wheel are also located.

In accordance with an added feature of the invention, the first freewheel, the second freewheel and a frictional element of the brake, are disposed on one and the same shaft. For example, the frictional element in the case of the previously mentioned band brake can be a brake disk or brake drum around which the brake band of the band brake partly wraps and is in frictional contact with the brake band during braking. The configuration of the two freewheel clutches and the frictional element on the common shaft is very advantageous with regard to a compact construction of the apparatus. In this development, the first gear wheel can be mounted above the first freewheel on the shaft and the second gear wheel can be mounted above the second freewheel on the shaft. In this case, the two gear wheels, the two freewheels (freewheel clutches) and the frictional element can be disposed coaxially with one another.

In accordance with an additional feature of the invention, the brake is an electric motor brake. In this case, the electric motor brake can be formed by the auxiliary motor, with the latter being run in generator operation. As a result of the multifunctional use of the auxiliary motor, it is possible to dispense with a brake that is different from the auxiliary motor.

In accordance with yet another feature of the invention, the first freewheel, the second freewheel and a controllable clutch for coupling the second gear wheel to the shaft are disposed on one and the same shaft. This development is advantageous in particular in connection with the construction of the brake, previously explained, as an electric motor brake formed by the auxiliary motor, with the controllable clutch being disposed to couple the second gear wheel to the shaft during the generator operation of the auxiliary motor. In this development, the first gear wheel can also be mounted on the shaft through the first freewheel, and the second gear wheel can be mounted on the shaft through the second freewheel.

In accordance with yet a further feature of the invention, the roller is a varnishing unit roller and/or an engraved roller. In the event that the roller is constructed as the varnishing unit roller, the latter can be a dip roller, a metering roller, an applicator roller or an engraved roller.

With the objects of the invention in view, there is concomitantly provided a printing press which is equipped with the apparatus for driving the roller constructed in accordance with the invention or constructed in accordance with one of the developments thereof.

Other features which are considered as characteristic for the invention are set forth in the appended claims.

Although the invention is illustrated and described herein as embodied in an apparatus for driving a roller of a printing press and a printing press having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
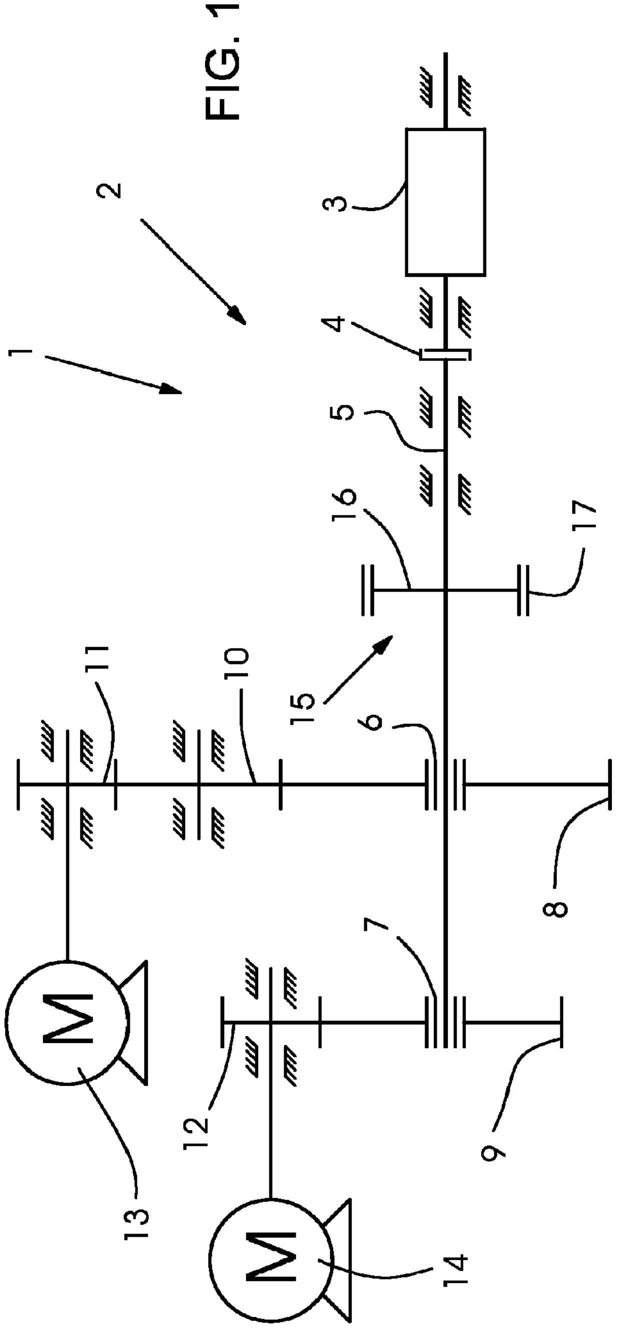
FIGS. 1 and 2 are schematic diagrams of a first exemplary embodiment, in which a brake is constructed as a band brake.
Figure 3:
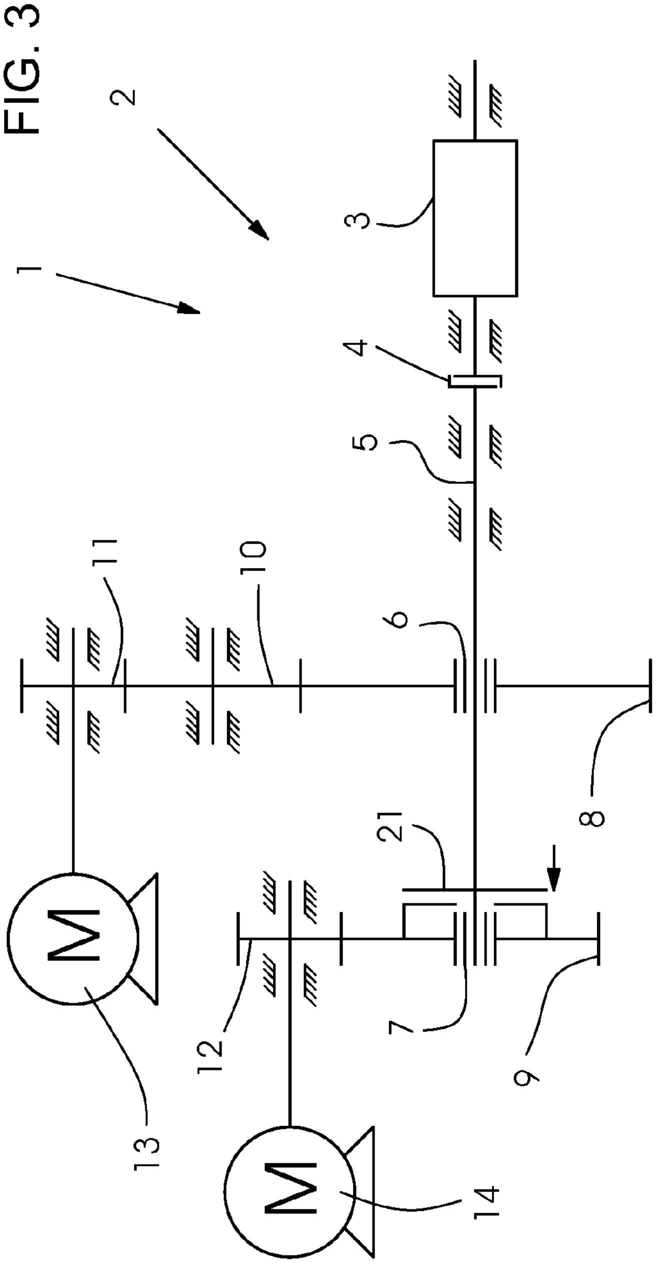
FIGS. 3 and 4 are schematic diagrams of a second exemplary embodiment, in which an auxiliary motor functions as a brake.

Referring now in detail to the figures of the drawings, in which mutually corresponding components and elements are designated by the same reference symbols, and first, particularly, to FIGS. 1 and 3 thereof, there is seen a section of a printing press 1 in each case. The printing press 1 is a sheet-fed press of in-line construction for offset printing and includes a varnishing unit 2 for varnishing printed sheets printed in offset printing units. The varnishing unit 2 includes an impression cylinder and a varnishing cylinder cooperating therewith, which are not shown in the drawing. In addition, the varnishing unit 2 includes a roller 3, which is an engraved roller. The roller 3 is mounted in quick-change roller locks, that are not specifically illustrated, which permit an operator to make a rapid roller change.

When the roller 3 is inserted in the printing press 1, an equalizing coupling 4, which connects the roller 3 to a shaft 5, is engaged. The equalizing coupling 4, which transmits torque from the shaft 5 to the roller 3, is formed as a dog coupling and includes one half coupling on an axle end of the roller 3 and one half coupling at an end of the shaft 5. The shaft 5 is mounted in such a way that it can rotate in a machine frame of the printing press 1.

A first gear wheel 8 is mounted on the shaft 5 through a first freewheel 6. A second gear wheel 9 is mounted on the shaft 5 through a second freewheel 7. When the gear wheels 8, 9 are rotated in a first direction of rotation, the two freewheels (freewheel clutches) 6, 7, effect a transmission of the torque from the respective gear wheel 8, 9 to the shaft 5 and, when the gear wheels 8, 9 are rotated in a second direction of rotation, they do not effect any transmission of the torque from the respective gear wheel 8, 9 to the shaft 5.

The first gear wheel 8 meshes with a third gear wheel 10, which meshes with a fourth gear wheel 11, which is driven in rotation by a main motor 13 of the printing press 1. The main motor 13 drives the offset printing units of the printing press 1 and the impression cylinder of the varnishing unit 2 in rotation. The second gear wheel 9 meshes with a fifth gear wheel 12, which is driven in rotation by an auxiliary motor 14. The motors 13, 14 are electric motors.

Figure 2:
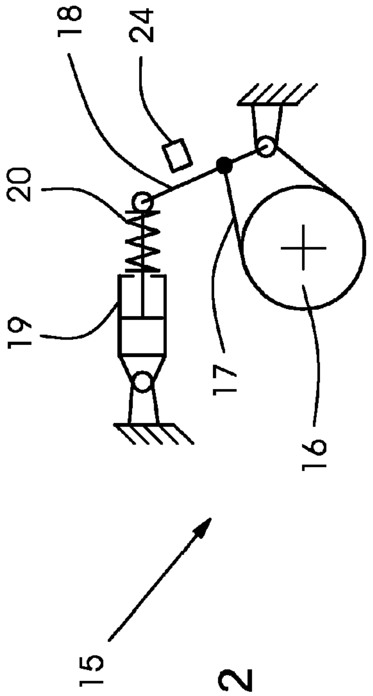

In a first exemplary embodiment, illustrated in FIGS. 1 and 2, a band brake 15 is disposed between the first freewheel 6 and the equalizing coupling 4 as a brake for braking the roller 3. The first freewheel 6 and the first gear wheel 8 driven by the main motor 13 through the gear train are disposed between the band brake 15 and the second freewheel 7.

FIG. 2 shows that the band brake 15 has a frictional element 16 in the form of a brake drum. The frictional element 16 is firmly connected to the shaft 5 so as to rotate with it and a brake band 17 wraps around it. During braking, the brake band 17 is tensioned firmly against the outer periphery of the frictional element 16 by pivoting a lever 18 about a joint. The lever 18 is mounted with one end in the joint and is attached at its other lever end to a piston rod of a pneumatic operating cylinder 19. One end of the brake band 17 is fixed to the lever 18 between the two ends of the latter, and the other band end is fixed to the joint about which the lever 18 can be pivoted. Seated on the piston rod is a helical spring 20 which can be loaded in compression. The helical spring 20 is supported with its one end on the piston rod and is supported with its other end on a cylinder housing of the operating cylinder 19. Accordingly, the spring 20 attempts to extend the piston rod and, in the process, to pivot the lever 18 in a clockwise direction with respect to FIG. 2 and thus to pull the brake band 17 against the frictional element 16. By applying compressed air to the operating cylinder 19, the piston rod can be retracted counter to the action of the spring 20, in order to release the band brake 15.

A sensor 24, which measures the distance between this sensor 24 and the lever 18 without contact, is used to measure the wear of the brake lining of the brake band 17. The greater the wear, the closer the sensor 24 is to the lever 18 when the band brake 15 is applied. When a specific wear limit is reached, the sensor 24 outputs a signal, through the use of which it is indicated to the operator that renewal of the brake lining is necessary. In the event of damage, for example fracture of the frictional element 16, the lever 18 comes into contact with the sensor 24 or with a component bearing the sensor 24, and the distance is substantially zero. As a result, the sensor 24 detects the damage and consequently stops the printing press 1 automatically.

Due to its slimness, the band brake 15 is particularly suitable for an application at the installation location indicated. As a result of forming the mechanical brake as the band brake 15, it is possible to place the brake beside the gear wheels 9 to 12 on what is known as the drive side of the printing press 1. When the operator triggers a machine stop signal, for example by pressing a knob on a control desk of the printing press 1, the main motor is stopped. As a result of the machine stop signal, the operating cylinder 19 is additionally activated by an electronic control device of the printing press 1, so that the application of compressed air thereto is canceled. As a result, the spring 20 is relieved of load and, consequently, presses the brake band 17 more intensely against the frictional element 16 through the lever 18. As a result of this application of the band brake 15, the rotational speed of the roller 3 is reduced very quickly until it stops.

The electronic control device mentioned can be provided and, for example, programmed in such a way that the band brake 15 is activated for a limited time on the basis of one or more control parameters, for example the rotational speed, the state of protective devices and/or the operating state of the printing press 1. After this time has elapsed, the actuating drive is activated again by the electronic control device, which is to say compressed air is applied to the operating cylinder 19, so that the band brake 15 is released again. The electronic control device then activates the auxiliary motor 14 so that, with the main motor 13 at a standstill, during the interruption to printing operation, the roller 3 rotates at a comparatively low rotational speed, which accordingly does not hold any risk of injury. In this case, the second freewheel 7 jams or engages and the first freewheel 6 freewheels or idles. It goes without saying that, during printing operation with the auxiliary motor 14 at a standstill, the first freewheel 6 jams or engages and the second freewheel 7 freewheels, which is to say runs without transmitting the torque from the shaft 5 to the second gear wheel 9.

Figure 4:
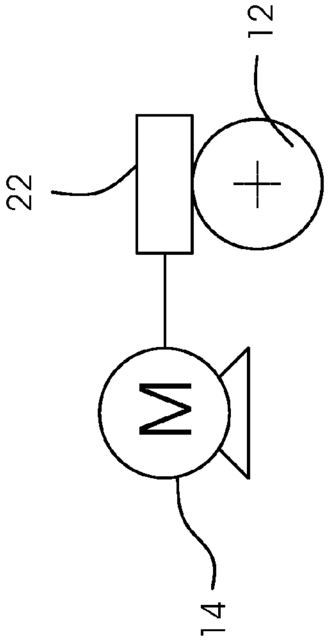

In the second exemplary embodiment, shown in FIGS. 3 and 4, a controllable clutch 21 is disposed on the shaft 5 between the first gear wheel 8 and the second gear wheel 9. When the controllable clutch 21, which can be controlled by the electronic control device, is engaged in a first switching state, the second freewheel 7 is bridged by the controllable clutch 21, so that a torque can be transmitted from the shaft 5 through the controllable clutch 21 to the second gear wheel 9 and thus to the auxiliary motor 14. This torque cannot be transmitted from the shaft 5 to the auxiliary motor 14 when the controllable clutch 21 is in a second switching state, in which the controllable clutch 21 is disengaged.

The connection of the fifth gear wheel 12 to the auxiliary motor 14 is illustrated in simplified form in FIG. 3 and in detail in FIG. 4. The auxiliary motor 14 is connected to the fifth gear wheel 12 through an intermediate gearbox 22, which increases the so-called holding torque of the auxiliary motor 14. The intermediate gearbox 22, which is only indicated schematically in FIG. 4, operates easily during the transmission of torque from the auxiliary motor 14 to the fifth gear wheel 12 and thus to the second gear wheel 9, and operates with resistance during the transmission of a torque from the second gear wheel 9 and thus from the fifth gear wheel 12 to the auxiliary motor 14.

During printing operation, the auxiliary motor 14 is at a standstill and the main motor 13 drives the roller 3 in rotation through the first freewheel 6. The controllable clutch 21 is disengaged during printing operation, so that the second freewheel 7 freewheels and no torque is transmitted from the shaft 5 to the second gear wheel 9 through the controllable clutch 21. As a result of the machine stop signal being triggered, the main motor 13 is stopped and the controllable clutch 21 is engaged. Consequently, the rotational energy of the roller 3 overrunning after the machine stop signal is transmitted through the engaged controllable clutch 21 to the auxiliary motor 14 which, in this case, is driven by the roller 3, so that the auxiliary motor 14 runs in generator operation and, as a brake, uses up the rotational energy of the roller 3, so that the latter is brought quickly to a standstill as a result. After the roller 3 has come to a standstill, the controllable clutch 21 is disengaged by the electronic control device and the auxiliary motor 14 is activated, so that the latter drives the roller 3 in rotation through the second freewheel 7 during the interruption to printing.

In both of the exemplary embodiments shown in FIGS. 1 to 4, it is necessary to drive the roller 3 in rotation during the interruption to printing operation in order to prevent the varnish on the roller 3 from drying out.

The invention claimed is:

1. An apparatus for driving a roller of a printing press having a drive side, the apparatus comprising:

first and second gear wheels;

first and second freewheels;

a main motor for driving the roller through said first gear wheel and said first freewheel;

an auxiliary motor for driving the roller through said second gear wheel and said second freewheel; and a brake, being different from said main motor, for braking the roller during overrunning of the roller following a machine stop signal;

said first gear wheel, said second gear wheel and said brake being disposed on the drive side of the printing press.

2. The apparatus according to claim 1, wherein said brake is a mechanical brake.

3. The apparatus according to claim 2, wherein said mechanical brake is a band brake.

4. The apparatus according to claim 1, which further comprises a shaft, said brake having a frictional element, and said first freewheel, said second freewheel and said frictional element being disposed on said shaft.

5. The apparatus according to claim 1, wherein said brake is an electric motor brake.

6. The apparatus according to claim 5, wherein said electric motor brake is formed by said auxiliary motor being run in generator operation.

7. The apparatus according to claim 1, which further comprises a shaft, and a controllable clutch for coupling said second gear wheel to said shaft, said first freewheel, said second freewheel and said controllable clutch being disposed on said shaft.

8. The apparatus according to claim 7, wherein said first gear wheel is mounted on said shaft through said first freewheel, and said second gear wheel is mounted on said shaft through said second freewheel.

9. The apparatus according to claim 1, wherein the roller is at least one of a varnishing unit roller or an engraved roller.

10. A printing press, comprising an apparatus according to claim 1.

* * * * *